No. 679,926. Patented Aug. 6, 1901.
W. L. VOELKER.
MANUFACTURE OF FILAMENTS FOR INCANDESCING ELECTRIC LAMPS.
(Application filed Nov. 19, 1900.)
(No Model.)
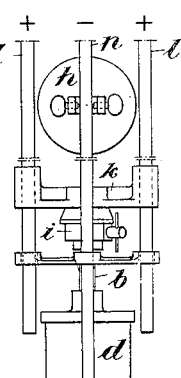
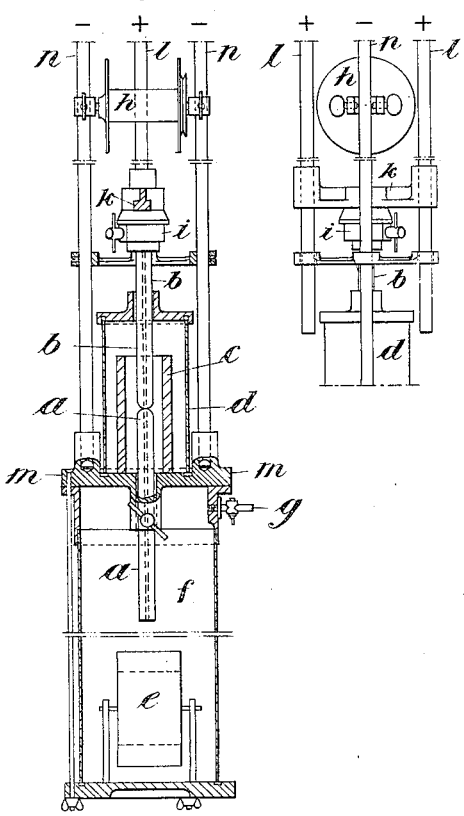
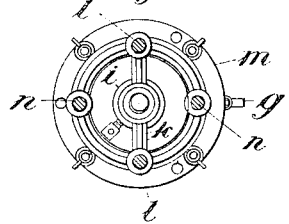
Witnesses:
Edmund S. Snewin
Inventor:
William Lawrence Voelker

UNITED STATES PATENT OFFICE.

WILLIAM LAWRENCE VOELKER, OF LONDON, ENGLAND, ASSIGNOR TO THERON CLARK CRAWFORD, OF ARROCHAR PARK, BOROUGH OF RICHMOND, NEW YORK, N. Y.

MANUFACTURE OF FILAMENTS FOR INCANDESCING ELECTRIC LAMPS.

SPECIFICATION forming part of Letters Patent No. 679,926, dated August 6, 1901.

Original application filed July 30, 1900, Serial No. 25,337. Divided and this application filed November 19, 1900. Serial No. 37,091. (No model.)

*To all whom it may concern:*

Be it known that I, WILLIAM LAWRENCE VOELKER, a citizen of the United States of America, residing at 42 Bernard street, Russell Square, London, England, have invented new and useful Improvements in the Manufacture of Filaments for Incandescing Electric Lamps, (in respect whereof I have applied for a patent in Great Britain to bear date June 22, 1900, No. 11,344,) of which the following is a specification.

This invention, a division of my application for Letters Patent filed July 30, 1900, Serial No. 25,337, relates to the manufacture of carbid filaments from carbonizable material capable of absorbing or otherwise taking up the salt of the metal—such as uranium, titanium, zirconium, or beryllium—which is to be combined with the carbon in the formation of the carbid.

In the accompanying drawings, Figure 1 is a vertical section of apparatus for use in passing the filament through an electric arc. Fig. 2 is a corresponding plan, and Fig. 3 a side view, of the upper portion of the said apparatus.

According to my improved method instead of making a thread or fiber of carbonizable material in a solution of the salt of the metal intended to form the metallic base of the carbid, as described in my application above referred to, the filament is prepared from graphite formed by passing a carbon filament through an electric arc, the atmosphere being displaced by hydrogen, or by vapor of a hydrocarbon, or of the particular metal to be combined with the carbon of the graphite in the formation of the particular carbid desired. The graphite filament prepared in this manner is then passed through an electric arc or electric furnace in the presence of vapor of the metal to be combined with the graphite in the production of the carbid. I prefer to employ arc-producing apparatus of the character hereinafter described.

The end of the carbon filament is passed through two longitudinally-perforated carbon electrodes $a$ $b$, mounted axially in line with one another and capable of being moved apart. The space to be occupied by the arc is immediately surrounded by a cylinder $c$, composed of the metal intended to form the metallic base of the carbid itself, this cylinder being in turn inclosed within a tight-fitting globe or vessel $d$, formed of glass or of the same substance as the cylinder. A small electric arc is struck between the extremities of the carbons $a$ $b$, so as to produce a high heating effect without much pressure, the globe or vessel $d$ being meanwhile charged with hydrogen or carbureted hydrogen, or with vapor of a hydrocarbon, or of the metal intended to form the metallic base of the carbid. The spool $e$, containing the filament, is preferably mounted in a gas-tight container $f$, to which the hydrogen or other gas is admitted by way of a cock $g$, the said gas passing from this container through the perforation in the carbon $a$ into the interior of the cylinder $c$ and globe or vessel $d$. The extremity of the filament having been passed through the carbon electrodes and carried to a drum or reel $h$, the filament is drawn through the electric arc at a speed depending upon the strength of the current. The carbid resulting has a metallic appearance, and although of a highly crystalline nature may, when cut into the required lengths, be readily bent into horseshoe form and mounted in incandescing lamp-globes in the ordinary manner. The temperature which should be employed at the final stage of converting the filament into carbid will vary slightly when working with different kinds of metals. The temperature appropriate may, however, be determined by that at which incipient fusion of the metallic oxid or oxids takes place.

The carbons $a$ $b$ may be mounted in a similar manner to those in an ordinary electric-arc lamp and their regulation effected by suitable mechanism or by hand. In the accompanying illustration the carbon $b$ is held in a socket $i$, carried by a transverse bar $k$, the latter being supported by rods $l$ $l$, while the carbon $a$ is carried by the plate $m$, in which the supporting-rods $n$ $n$ terminate.

The method of manufacture hereinbefore described is well adapted for use in the production of incandescing-lamp filaments where uranium, titanium, zirconium, or beryllium, either singly or in combination or in combination with other metals, is employed as the metallic base of the carbid.

What I claim as my invention, and desire to secure by Letters Patent, is—

The herein-described method of producing carbid filaments for electric incandescing lamps, consisting in passing a carbon filament through an electric arc, the atmosphere being displaced by hydrogen or like gas or by vapor of the metal or metals intended to form the metallic base of the carbid, and passing the filament, thus converted into graphite, through an electric arc while surrounded by a cylinder or like envelop composed of the aforesaid metallic base and inclosed within a vessel charged with vapor of the metal or metals constituting the metallic base of the carbid to be produced, substantially as set forth.

In testimony whereof I have signed my name to this specification in the presence of two subscribing witnesses.

WILLIAM LAWRENCE VOELKER.

Witnesses:
EDMUND S. SNEWIN,
WM. O. BROWN.